(12) United States Patent
Lazier

(10) Patent No.: US 9,165,002 B1
(45) Date of Patent: Oct. 20, 2015

(54) INEXPENSIVE DELETION IN A DATA STORAGE SYSTEM

(75) Inventor: Colin L. Lazier, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 285 days.

(21) Appl. No.: 13/535,195

(22) Filed: Jun. 27, 2012

(51) Int. Cl.
*G06F 17/30* (2006.01)
(52) U.S. Cl.
CPC ............................... *G06F 17/30085* (2013.01)
(58) Field of Classification Search
CPC .................................................. G06F 17/30085
USPC .......................................................... 707/663
See application file for complete search history.

(56) References Cited

U.S. PATENT DOCUMENTS

| 7,801,863 B2 * | 9/2010 | Brown et al. ................. 707/663 |
| 2006/0200700 A1 * | 9/2006 | Malcolm ......................... 714/38 |
| 2006/0288048 A1 * | 12/2006 | Kamohara et al. ............ 707/200 |
| 2008/0034003 A1 * | 2/2008 | Stakutis et al. ............... 707/200 |
| 2008/0177811 A1 * | 7/2008 | Cannon et al. ................. 707/206 |
| 2008/0219122 A1 * | 9/2008 | Detzler et al. .................. 369/83 |
| 2011/0106771 A1 * | 5/2011 | McDonald et al. ........... 707/663 |

OTHER PUBLICATIONS

Department of Defense, U.S.A., "National Industrial Security Program Operating Manual (NISPOM)," DoD 5220.22-M, Feb. 2006.

* cited by examiner

*Primary Examiner* — Fred I Ehichioya
*Assistant Examiner* — Kris Mackes
(74) *Attorney, Agent, or Firm* — Kilpatrick Townsend & Stockton LLP

(57) ABSTRACT

Systems and methods are provided herein for storing data to enable inexpensive and/or guaranteed deletion of data. In various embodiments, a customer specifies a data deletion indication associated with a data object to be stored, specifying when and/or how to delete the data object. Such a data deletion indication may be based, for example, on a regulatory compliance requirement. Based at least in part on the data deletion indication, the storage system may select, from a plurality of storage devices, a storage device to store the data object. Data objects with similar data deletion indications may be stored in the same storage device. In some embodiments, a data object stored in a storage device using the methods described herein may be deleted as part of the deletion of all or a portion of the storage device near a time specified by the data deletion indication of the data object.

25 Claims, 6 Drawing Sheets

INEXPENSIVE DELETION IN A DATA STORAGE SYSTEM

BACKGROUND

With rapidly increasing amount of data to be stored, there is a need for storage systems to cheaply and promptly remove data that is no longer in use. Traditionally, storage systems have relied on processes such as garbage collectors to identify useful data and to reclaim unused storage space. However, such processes, even if run in the background, consume substantial computing resources. Further, such processes are typically run infrequently, leading to the accumulation of storage space that can otherwise be reclaimed earlier. Finally adding to the cost of data deletion is the often stringent data deletion standards that may be associated with the storage of sensitive data.

BRIEF DESCRIPTION OF THE DRAWINGS

Various embodiments in accordance with the present disclosure will be described with reference to the drawings, in which.

DETAILED DESCRIPTION

Figure 1:
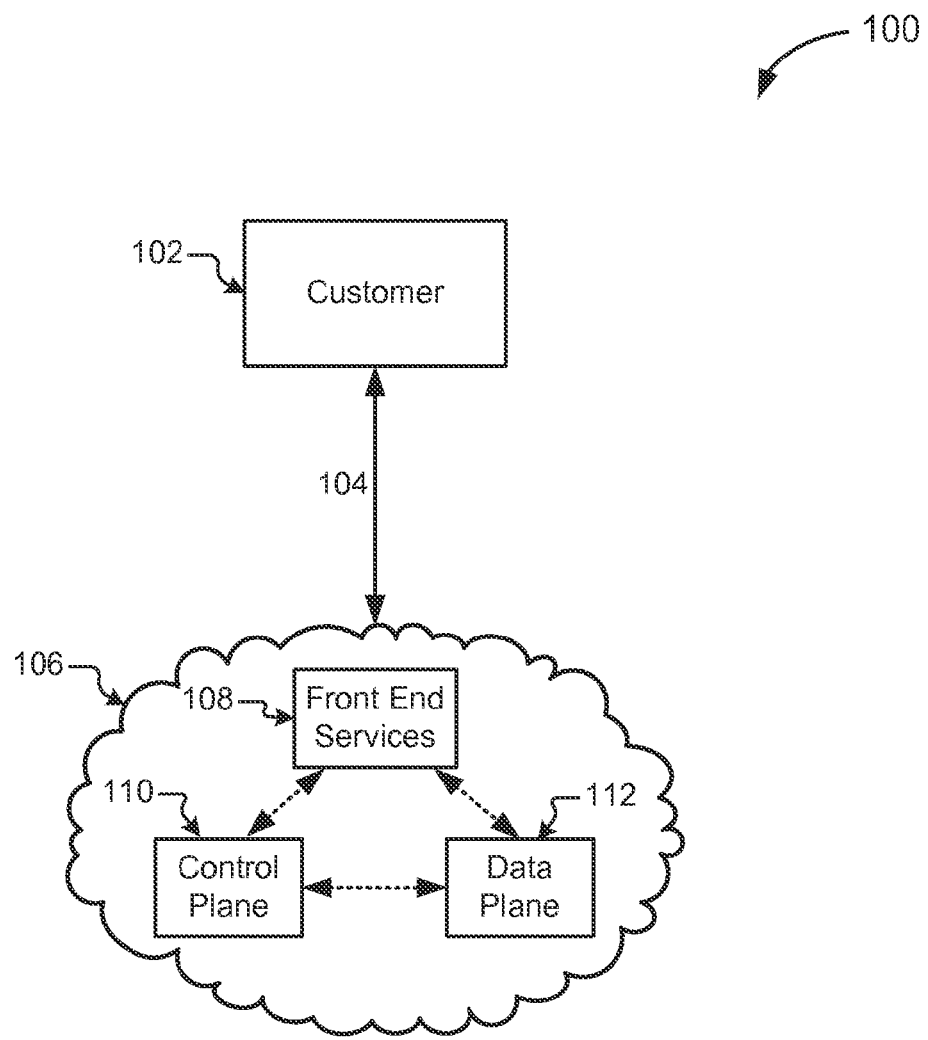
FIG. 1 illustrates an example of an environmental configuration that can be used in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for storing data so as to provide inexpensive and/or guaranteed deletion of data. As used herein, deletion of a data object means rendering the data object inaccessible. In various implementations, deletion of a data object may include overwriting the storage of the data object with predetermined, random, or otherwise useless data, encrypting the data object and rendering the cryptographic key inaccessible, degaussing, and/or physical destroying (e.g., shredding) the storage device storing the data object, and the like. Some of these implementations may render a data object permanently inaccessible.

In various embodiments, a customer entity, connected to a storage system, may request the storage of a data object and specify a data deletion indication associated with the data object. Such a data deletion indication may include a data deletion time specifying when the data object is to be deleted and/or a data deletion method specifying how the data object is to be deleted. In some embodiments, such data deletion indications may be based at least in part on government or industry regulatory requirements. For example, some data may be deleted only after a mandatory retention period (e.g., five years). For another example, some data must be deleted using a method that complies with a government/industry standard (e.g., such a standard may specify the minimum number of rounds the data must be overwritten).

In various embodiments, the storage system selects a storage device, based at least in part on a data deletion indication associated with a data object, to store the data object. In particular, in some embodiments, the storage system causes data objects that share similar data deletion indications to be stored in the same storage device. For example, in some embodiments, the storage system selects a storage device whose device-specific deletion indication approximately matches the data deletion indication associated with the data object to be stored. As used herein, a device-specific deletion indication specifies when and/or how a portion of a storage device is to be deleted. Such device-specific deletion indication may be determined based at least in part on the data deletion indications of the data objects stored in the storage device, the inherent characteristics of the storage device (e.g., useful remaining life of a storage device), the next scheduled run of a garbage collection process, and the like.

In some embodiments, a data object stored in a storage device using the methods described herein may be deleted as part of the deletion all or a portion of the storage device near a time specified by the data deletion indication of the data object. For example, in some embodiments, the storage system deletes at least a portion of a storage device at a time and/or using a method indicated by the device-specific deletion indication associated with the storage device. As used herein, deleting a portion of a storage device means rendering inaccessible data stored in at least that portion of the storage device. In various implementations, deleting a storage device portion includes methods for deletion of data objects, described above. Some of these embodiments, such as physical destruction of the storage device, may render data stored on the storage device permanently inaccessible. In some embodiments, a storage device (e.g., a hard disk) is deleted as a whole. In other embodiments, deletion of data on a storage device occurs on a more granular basis. For example, a storage device may be partitioned into a plurality of regions and deletion of data in some of the regions does not affect data in other regions on the device. In various embodiments, the particular deletion method used to delete at least the storage device portion may depend on regulatory requirement governing data stored therein, inherent characteristics of the storage device, storage policies, service agreements, and the like.

In some embodiments, the storage system encodes a data object into a plurality of encoded fragments of data ("data shards") before storing those data shards in the storage system. In various embodiments, the storage system may obtain encoded data shards by dividing, encrypting, replicating, or otherwise transforming at least a portion of the data to be stored using a coding scheme (e.g., an erasure coding scheme). In some embodiments, each of at least some of the plurality of encoded data shards may be stored and/or deleted according to the methods described herein.

As will be appreciated, storing and deleting data according to the methods described herein likely reduces the cost associated with data deletion associated using conventional techniques. For example, traditionally, data deletion may involve marking data as deleted and relying on garbage collection process to periodically scan the data on a storage device, copy useful data (e.g., data not marked deleted or referenced by other useful data) to another location and reclaim the space on the storage device. In contrast, by storing data with similar deletion time on a particular portion of a storage device, as disclosed in one embodiment, that portion of the device may be deleted as a whole close to the deletion time, eliminating the cost of scanning and copying data and promptly freeing up space on the storage device. Finally, the disclosed methods make it easier to comply with regulatory requirement related to data deletion as data with similar regulatory compliance requirement (e.g., in terms of deletion time and/or deletion methods) can be stored on the same storage device and hence deleted wholesale according to the requirement.

Various other applications, functions, and advantages are presented below with respect to the various embodiments. It should be understood that the description and figures provide a number of examples, but the alternatives and variations possible within the scope of the various embodiments are not fully described. Alternatives and variations, however, would be apparent to one of ordinary skill in the art in light of the teachings and suggestions contained herein.

FIG. 1 illustrates an example environment 100 for implementing aspects in accordance with various embodiments. One or more customers 102 connect, via a network connection 104, to a data storage system 106. Unless otherwise clear from context, the term "customer" refers to the system(s) of a customer entity (such as an individual, company, or other organization) that utilizes data storage services described herein. Such systems may include datacenters, mainframes, individual computing devices, distributed computing environments and customer-accessible instances thereof, or any other system capable of communicating with the data storage system. In some embodiments, a customer may refer to a machine instance e.g., with direct hardware access) or virtual instance of a distributed computing system provided by a computing resource provider that also provides the data storage system. In some embodiments, the computing resource provider includes a multi-tenant computing resource provider. In some embodiments, the data storage system integral to the distributed computing system, and may include or be implemented by an instance, virtual or machine, of the distributed computing system. The network connection may be a public network connection, such as an Internet connection, a private network connection such as a virtual private network connection or direct network connection, or any other type of connection that places the customer in connection with the distributed storage system.

In some embodiments, the data storage system comprises multiple subsystems that each have a corresponding role. For example, as illustrated in FIG. 1, the data storage system may include a set of front end services 108, a control plane 110, and a data plane 112. In such embodiments, the front end services are implemented by a system that provides one or more public access components to interface the data storage system with external entities, such as the customers described herein. For example, the front end services may include an application programming interface (API) to enable a user to programmatically interface with the various features, components and capabilities of the data storage system. Such capabilities may include data storage, data retrieval, metadata queries, configuration of various operational parameters, and the like. The front end services may also include customer authentication, customer authorization, usage metering, and billing-related functions. Additionally, in some embodiments, the front end services may include an ingress and egress point for all data flowing into and out of the data storage system, e.g., to and from customers.

In some embodiments, the control plane provides transient storage or caching for data transiting between the data plane and the front end (and thus, to and from external entities). The term "plane" refers, in some embodiments, to a collection of individual components that together are a subsystem for providing a set of functionality. For example, in some embodiments, the control plane provides temporary storage for data to be stored and data to be retrieved by a customer in a timeframe that is independent, from a customer perspective, of that of the data plane. Some embodiments may include job planning optimization, checkpointing and recovery for customer jobs, the benefits of which become more evident as the customer job becomes larger or more demanding.

In some embodiments, the data plane includes storage-related functionality, including data encoding, data placement optimization, data deletion, detection of entropic effects upon data stored upon the storage hardware, anti-entropy correction routines, and the like. Entropic effects include, but are not limited to, performance degradation due to data fragmentation resulting from repeated write and rewrite cycles, hardware wear (e.g., of magnetic media), data unavailability and/or data loss due to hardware malfunction, environmental factors, physical destruction of hardware, random chance, or other causes. The data plane may detect such effects and in some embodiments may preemptively and/or reactively institute anti-entropy correction routines and/or policies. Such anti-entropy correction measures may include, but are not limited to, garbage collection routines and various data deletion methods described herein. The storage hardware may include any number and type of storage devices and entities, such as datacenters, storage servers, hardware storage devices such as tape drives, hard disk drives and solid state devices, and the like. Such hardware may be organized into any topology, including hierarchical topologies.

Figure 2:
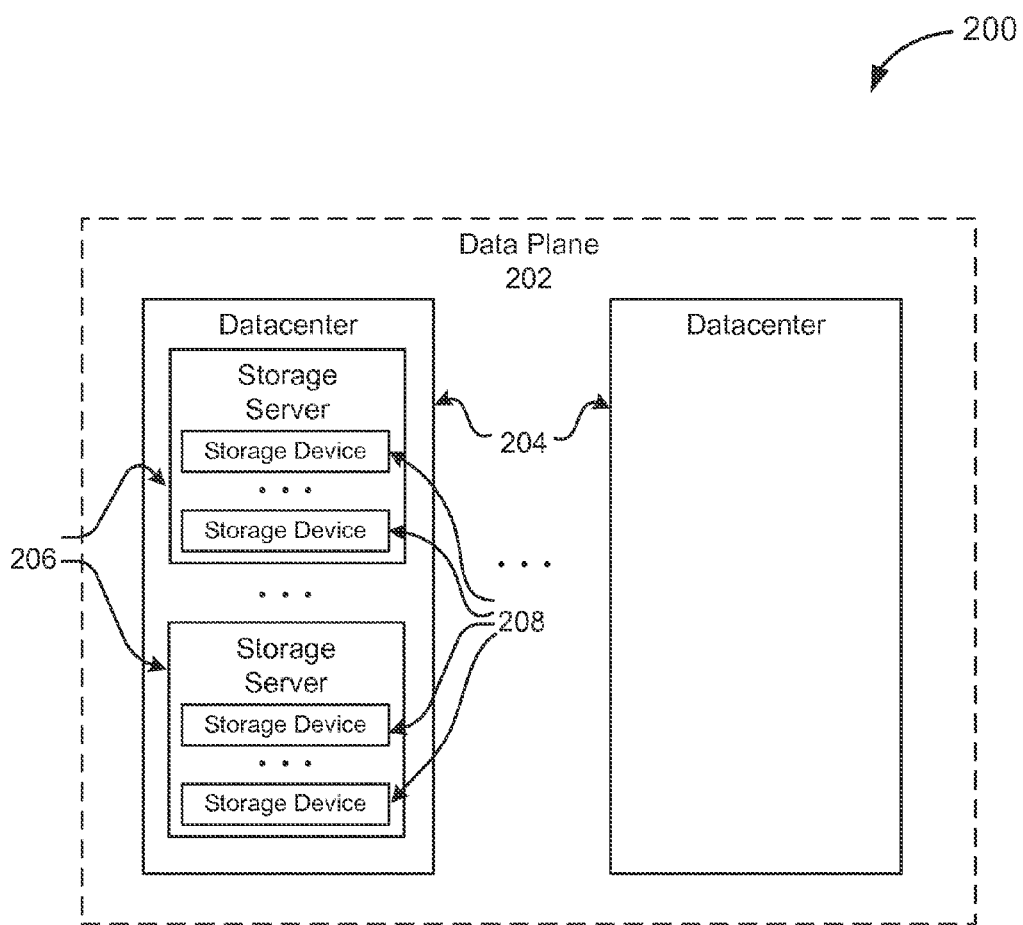
FIG. 2 illustrates an example of an environment that can be used in accordance with at least one embodiment.

FIG. 2 illustrates an example hardware topology 200 for a data storage system in which the techniques described herein may be applied. A data plane 202, similar in some embodiments to the data plane 112 described in connection with FIG. 1, includes a one or more datacenters 204. Each datacenter may be a facility, which may have its own postal address, and which may comprise one or more storage servers 206, which in turn each include one or more storage devices 208. The datacenters may, in some embodiments, be configured similarly to one another, or may contain differing numbers and/or types of constituent devices. Similarly, the storage servers and/or the storage devices may be uniform, tiered, differentiated or any combination thereof. For example, the storage devices, storage servers and/or datacenters may be organized in a differentiated fashion (e.g., by price, performance, capacity, and/or function), such as would be the case in a typical hierarchical ("tiered") storage system. Such a hierarchical storage system may automatically move data between relatively higher-cost, higher-speed data storage devices and relatively lower-cost, lower-speed storage devices within the data plane.

As an alternative example, a simpler storage system may utilize a data plane wherein the various devices, servers and/or datacenters are substantially similar in price, performance, capacity and/or functional attributes. As may be contemplated, storage devices may include any media capable of storing data and in any configuration, including solid state storage devices (SSDs), conventional electromechanical hard disk drives, hybrid hard disk drives, shingled magnetic recording hard drives, optical media, optoelectrical media, magneto-optical media, and tape drives. In some embodiments, such storage devices, including hard drives, are not enterprise-level drives, but are, e.g., consumer-level or commodity-level drives that may not have a large number of reliability-enhancing features. Likewise, datacenters, storage servers and storage devices may be physical, virtual, or any abstraction thereof (e.g., instances of distributed storage and/or computing systems). Similarly, the components of the data plane may be dispersed, local or any combination thereof. For example, various computing and/or governing components (such as those portions responsible for storing and deletion of data) may be local or remote to any number of datacenters, servers, or storage devices, which in turn may be local or remote relative to one another. Any of the exemplary storage system configurations described herein, as well any other storage system configuration or combination, may benefit from the various techniques described herein.

Figure 3:
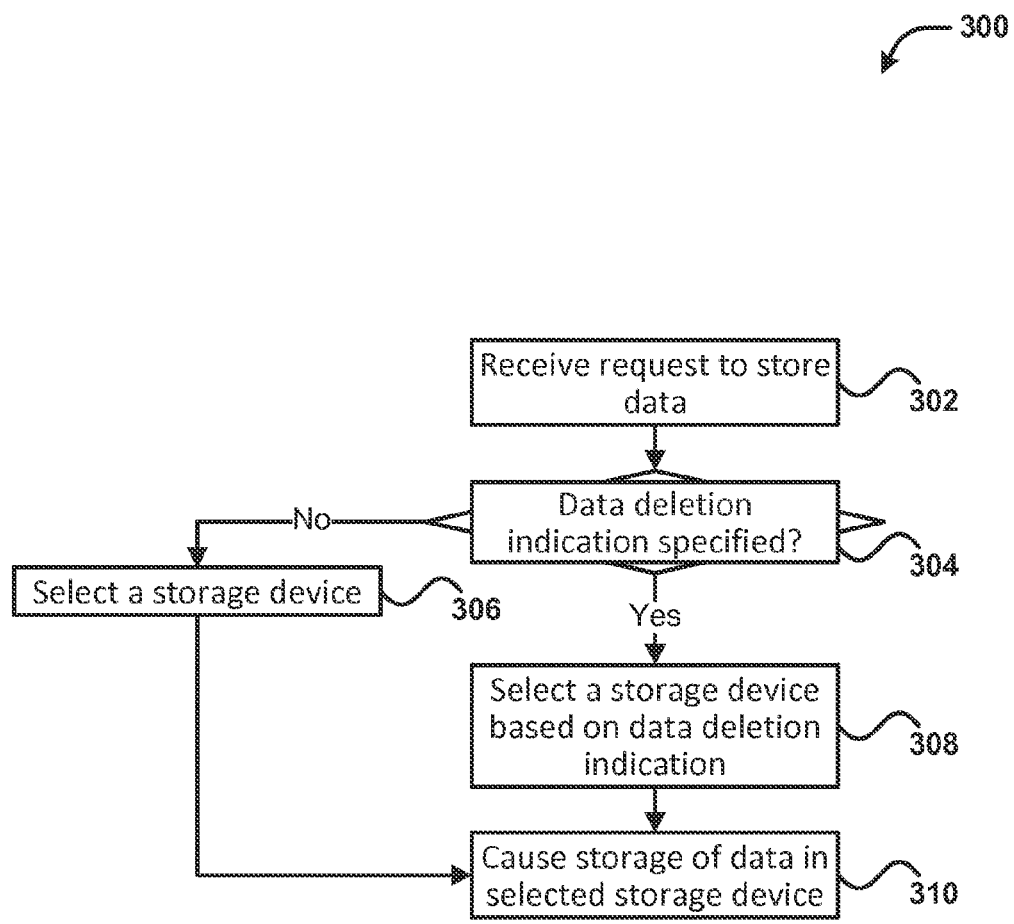
FIG. 3 illustrates an example process for storing data in accordance with at least one embodiment.

FIG. 3 illustrates an example process 300 for storing data, in according with one embodiment. Some or all of the process 300 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. For example, in one embodiment, a component of data plane 202 as described in connection with FIG. 2 performs process 300. In another embodiment, components from a front end service 108, control plane 110, and data plane 112 discussed in FIG. 1 collectively perform process 300.

In block 302, a system performing process 300 receives a request to store a data object, for example, in storage system 106. Such a request may originate from and be received by any appropriate entity, including the customer entity itself, components and/or entities of the computer system(s), and/or components and/or entities of the storage system. For example, in some embodiments, the storage request may include an Hypertext Transfer Protocol ("HTTP") PUT request or an HTTP POST request. While HTTP requests are used herein for the purpose of illustration, the scope of the disclosure is not limited to this particular protocol, but other protocols may be used. For example, in some embodiments, storage request may include messages between components connected in a storage area network ("SAN"), such as datacenters, storage servers, and storage devices in data plane 202 discussed in FIG. 2, using a suitable communication protocol such as Small Computer System Interface ("SCSI"). Generally, any protocol or combination of protocols for communicating a request may be used.

In decision block 304, a system performing process 300 determines whether a data deletion indication is associated with the data object to be stored. In various embodiments, a data storage request may be associated with one or more data objects, at least some of which may be associated with one or more data deletion indications. As discussed above, a data deletion indication may include a data deletion time specifying when the data object is to be deleted, a data deletion method specifying how the data object is to be deleted, and the like. In some embodiments, data deletion method and data deletion time may be specified in the same request. In some embodiments, data deletion method and data deletion time may be specified in separate requests. For example, data deletion method may be specified as part of data deletion indication or as a separate indication. In some embodiments, a data deletion indication is specified by the entity sending the data storage request. For example, the entity may specify a specific time for the data to be deleted. For another example, the entity may indicate that the data must be rendered permanently inaccessible. For yet another example, the entity may specify a regulatory requirement that the data must comply with. In other embodiments, a data deletion indication may be inferred based at least in part on one or more predefined rules. For example, a rule may require that data coming from a certain entity be associated with a predetermined deletion indication.

As discussed above, a data deletion indication typically specifies a deletion time of when a data object is to be deleted. In various embodiments, deletion time may be specified in various formats. For example, deletion time include a specific time in the future (e.g., "after May 21, 2012," "after 3 months"), a time window during which the deletion should occur (e.g., "between Jun. 1, 2013 and Jul. 1, 2012"), and the like. In various embodiments, deletion time may be specified in various granularities, e.g., years, months, days, minutes, seconds, and the like.

In some embodiments, data deletion time may be based at least in part on a regulatory requirement. For example, the Sarbanes-Oxley Act ("SOX") requires a mandatory retention period of five years for the storage of business records. Thus, data subject to SOX may have a deletion time of five years from data creation. In some embodiment, an entity making the storage request may specify an explicit data deletion time (e.g., "after 30 days"). In some other embodiments, an entity may provide an implicit indication of data deletion time (e.g., the name of a particular regulatory requirement governing the data to be stored). As an example, the data deletion indication may simply specify that the data deletion should occur in compliance with some regulation. The actual time for deletion may then be determined by a system different from the system that specified the data deletion indication, for example, by a data management system. Generally, a data deletion indication may be any information from which a time or time period for deleting data may be ascertained.

Besides indicating when a data object is to be deleted, in some embodiments, a data deletion indication may also specify how the data object is to be deleted. For example, an entity sending the storage request may indicate that the data to be stored is to be rendered permanently inaccessible. For another example, an entity sending the storage request may specify a standard that data deletion must comply with. Examples of such standards include DoD 5220.22-M ("National Industrial Security Program Operating Manual," U.S. Department of Defense, February 2006) providing that destruction of classified information stored in a magnetic medium (e.g., magnetic disk) must include degaussing and physically destruction of the medium. As another example, many countries (e.g., U.S., Canada, United Kingdom) have data overwriting standards providing, for example, patterns and/or the minimum number of times that data storage must be overwritten.

Still referring to FIG. 3, if a data deletion indication is determined not to be specified, then in block 306, a system performing process 300 selects a storage device to store the data using methods known to persons skilled in the art. For example, a system performing process 300 may select a storage device based at least in part on the size of the data and the capacity of available storage devices. For another example, process 300 may select a storage device based at least in part on one or more policies, service-level agreement terms, and the like. Once a storage device is selected, a system performing process 300 stores the data in the selected storage device in block 310.

Otherwise, if a data deletion indication is determined to have been specified, then in block 308, a system performing process 300 selects a storage device, for example, from a plurality of storage devices, based at least in part on the data deletion indication. In some embodiments, a system performing process 300 selects a storage device with a device-specific deletion indication that approximately matches the data deletion indication. As discussed above, a device-specific deletion indication specifies when and/or how a portion of a storage device is to be deleted. In some embodiments, there may be more than one device-specific deletion indications associated with various portions of a storage device.

As discussed above, deleting a portion of a storage device means rendering inaccessible at least the portion of the storage device. In various implementations, deleting a portion of a storage device may include overwriting at least the portion of the storage device with useless data, encrypting the data stored in at least the portion of the storage device and rendering the cryptographic key inaccessible, degaussing, and/or physical destroying (e.g., shredding) the storage device, and the like. Some of these implementations may render data stored on a storage device permanently inaccessible.

In some embodiments, a system performing process 300 selects a storage device if the storage device has device-specific deletion time that approximately matches a deletion time specified by the data deletion indication associated with the data to be stored. For example, a system performing process 300 may select, from a plurality of storage devices, a storage device that has a deletion time that is the closest to the data deletion time. For another example, a system performing process 300 selects a storage device that has a device-specific deletion time within certain time (e.g., 2 days) of the data deletion time. In various embodiments, the device-specific deletion time of the selected storage device may be the same as, before, or after the data deletion time. In various embodiments, the device-specific deletion time may be adjusted based at least in part on a data deletion time associated with a data object. For example, if a storage device originally has a device-specific deletion time of Aug. 12, 2012, and the data deletion time of a data object is Aug. 13, 2012, the device-specific deletion time may be changed to Aug. 13, 2012 after the storage device is selected to store the data object. In some embodiments, if the device-specific deletion time falls after the data deletion time of a data object, the data object may be rendered temporarily inaccessible at the data deletion time (e.g., by removing references to the data object) and rendered permanently inaccessible later at the device-specific deletion time.

In various embodiments, a device-specific deletion time may be assigned to a storage device. In some embodiments, a system performing process 300 dynamically determines a device-specific deletion time associated with a storage device based at least in part on a plurality of factors. In other embodiments, a system performing process 300 merely retrieves a predefined device-specific deletion time associated with a storage device. In some embodiments, a device-specific deletion time may be based at least on data deletion times associated with at least some of the data objects stored in the storage device. For example, a device-specific deletion time may be set to be the same as or shortly after the latest data deletion time of the data objects. As an example, consider a storage device storing three data objects with deletion dates "May 1," "May 2," and "May 3," respectively. According to one embodiment, the device-specific deletion time of the storage device may be "May 3" or shortly thereafter. In some other embodiments, a device-specific deletion time may be based at least in part on inherent characteristic(s) of a storage device such as durability, capacity, performance, and the like. For example, a storage device that is near the end of its useful life may have a relatively short device-specific deletion time. In some other embodiments, a device-specific deletion time may be determined based at least in part on a policy, service-level agreement, and the like. In yet some other embodiments, a device-specific deletion time may be set to coincide with the time a garbage collection process is scheduled to process that particular storage device.

In some embodiments, a system performing process 300 selects a storage device if the storage device is associated with a device-specific deletion method that is similar to a deletion method specified by the data deletion indication associated with the data to be stored. For example, a device that is near the end of its useful life may be associated with a deletion method that includes physical destruction, such as degaussing and/or shredding, leaving all data therein permanently inaccessible. In some embodiments, such a storage device may be used to store data objects that are to be rendered permanently inaccessible. For another example, a storage device may be associated with a deletion method that includes certain rounds of data overwrite. In some embodiments, such a storage device may be used to store data objects that must comply with a deletion standard(s) requiring a number of overwrite rounds that is the same or less than the number of data overwrite rounds associated with the storage device. In various embodiments, criteria such as those discussed above may be combined with other storage device selection criteria known to those skilled in the art to select a storage device.

Still referring to FIG. 3, in block 310, a system performing process 300 causes the data to be stored in the selected storage device. In some embodiments, the data may be processed (e.g., encrypted) before being stored in the storage device. In some embodiments, a system performing process 300 causes data to be stored in a portion of the storage device which is to be deleted according to a device-specific deletion time that is close to a data deletion time of the data object. In some embodiments, a system performing process 300 invokes other components, processes, services, and the like, to store the data in the selected storage device.

Figure 4:
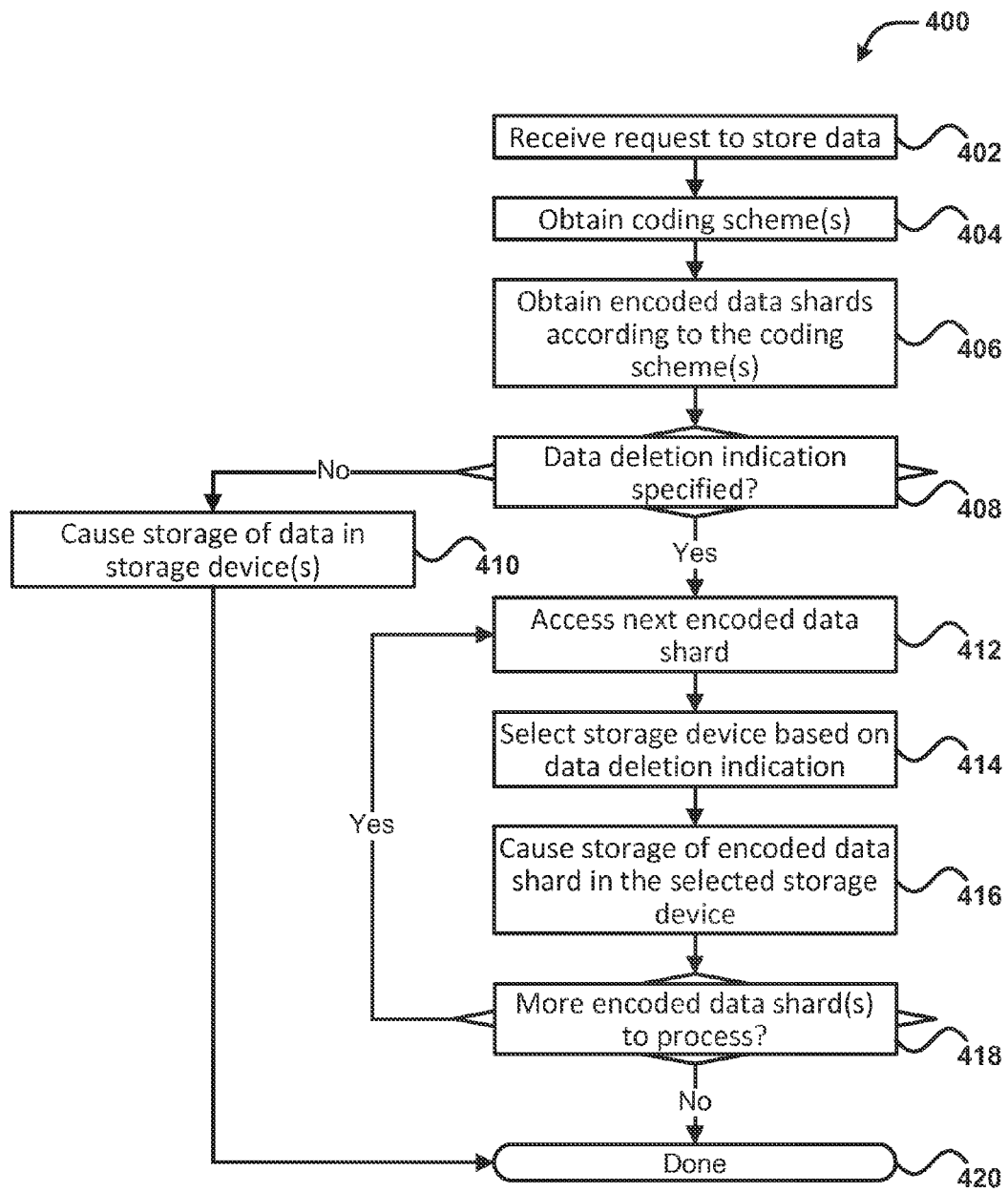
FIG. 4 illustrates an example process for storing data in accordance with at least one embodiment.

FIG. 4 illustrates an example process 400 for storing data, in according with another embodiment. For example, in one embodiment, components of data plane 202 as described in connection with FIG. 2 perform process 400. In another embodiment, components from a front end service 108, control plane 110, and data plane 112 discussed in FIG. 1 collectively perform process 400.

In block 402, a system performing process 400 receives a request to store a data object, for example, in storage system 106. As discussed in connection with FIG. 3, such a request may originate from and be received by any appropriate entity, including the customer entity itself, components and/or entities of the computer system(s), and/or components and/or entities of the storage system. For example, in some embodiments, the storage request may include an HTTP PUT request or an HTTP POST request. While HTTP requests are used herein for the purpose of illustration, the scope of the disclosure is not limited to this particular protocol, but other protocols may be used. For example, in some embodiments, storage request may include messages between components connected in an SAN, such as datacenters, storage servers, and storage devices in data plane 202 discussed in FIG. 2, using a suitable communication protocol such as SCSI. Generally, any protocol or combination of protocols for communicating a request may be used.

In block 404, a system performing process 400 obtains one or more coding schemes to encode the data to be stored. In various embodiments, such coding schemes include encryption algorithms, error-correction schemes, such as redundant array of independent disks ("RAID") schemes, erasure coding, and the like, and other data coding schemes known to those skilled the art. Of course, the scope of the present disclosure is not limited to known coding schemes, and other coding schemes, including those schemes not yet known may also be used in various embodiments.

In block 406, a system performing process 400 obtains encoded data shards of the data object according to the coding scheme(s) obtained above. In various embodiments, one or more coding schemes may be used to divide, encrypt, replicate, or otherwise transform at least a portion of a data object into a plurality of encoded data shards. For example, in one embodiment, a data object may be first encrypted using an encryption algorithm. Then, the encrypted data object may be encoded, using an erasure coding scheme, into N encoded data shards, where N is a positive integer.

In decision block 408, a system performing process 400 determines whether a data deletion indication is associated with the data object to be stored. Various embodiments for determining whether the data deletion indication is associated with the data object can be described above in connection with FIG. 3.

If a data deletion indication is determined not to be specified, then in block 410, a system performing process 400 causes storage of the data shards in one or more selected storage devices. For instance, methods known to those skilled in the art may be used to ensure that the data shards are stored in the one or more storage devices. For example, data shards may be stored across multiple storage devices according to a particular RAID standard, e.g., RAID 6. For another example, N erasure-coded data shards may be stored across M storage devices, where M<N and where M may be a positive integer. Of course, the scope of the present disclosure is not limited to known storage methods, and other storage methods, including those methods not yet known may also be used in various embodiments.

Still referring to FIG. 4, if a data deletion indication is determined to have been specified, then beginning in block 412, a system performing process 400 processes each encoded data shard in turn. In block 414, a system performing process 400 selects a storage device to store the current encoded data shard based at least in part on a data deletion indication. Various embodiments include at least those discussed in connection with FIG. 3. In most embodiments, data placement restrictions associated with a particular coding scheme (e.g., erasure coding scheme) used to produce the data shard are honored in the selection of storage device for the data shard.

Once a storage device is selected, in block 416, a system performing process 400 stores the current encoded data shard in the selected storage device. In various embodiments, encoded data shards may be stored sequentially or in parallel. In decision block 418, a system performing process 400 determines whether there are more encoded data shard(s) to process. If so, a system performing process 400 iterates back to block 412 to process the next encoded data shard. Otherwise, process 400 ends in block 420. In various embodiments, a system performing process 400 may process some or all of the encoded objects sequentially or in parallel.

In some embodiments where data deletion indication is specified for a data object, blocks 412-418 may be used to store some of data shards of the data object while block 410 may be used to store other data shards of the data object. For example, a data object may be erasure-coded into N shards, at least X of which are required to reconstruct the data object (where X and N are positive integers and X is less than N), yielding a stretch factor of N/X. In one embodiment, at least N−X+1 of the data shards may be stored according to blocks 412-418 and the remaining shards may be stored according to block 410. For example, suppose N=10 and X=7, meaning a data object is erasure-coded into 10 shards, 7 of which is required to reconstruct the object. In this case, 4 or more of the shards may be stored using methods described herein so that they will be deleted promptly and inexpensively (for example, by a system performing process 5 illustrated by FIG. 5) while the remaining 6 or less shards may be stored using conventional data storage techniques (e.g., in a randomly selected storage device) and deleted much after the specified data deletion time, if at all. This is because the deletion of the 4 or more shards would make it impossible to reconstruct the data object from the remaining 6 or less data shards, effectively rendering the data object inaccessible.

Figure 5:
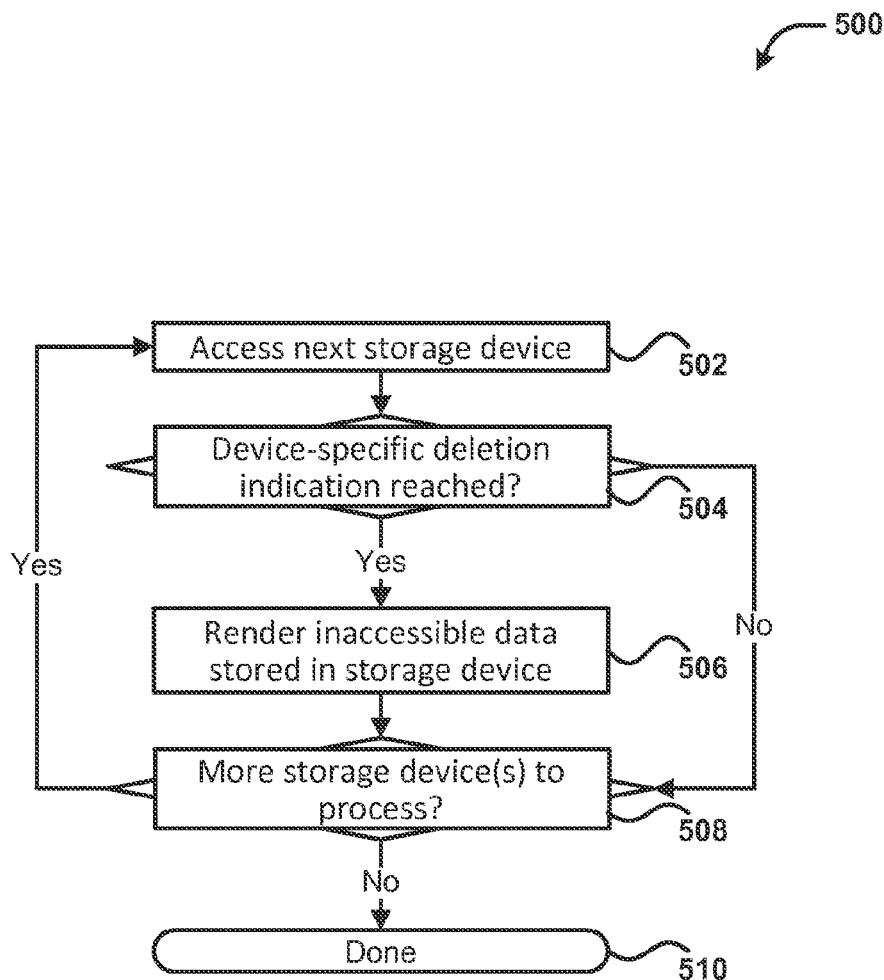
FIG. 5 illustrates an example process for deleting data in accordance with at least one embodiment.

FIG. 5 illustrates an example process 500 for deleting data, in according with one embodiment. In particular, a storage device or a portion thereof storing data objects with a known deletion time may be deleted according to the known deletion time without examining the content of the storage device or the portion thereof. In some embodiments, one or more components in data plane 202 described in FIG. 2 perform process 500. For example, in one embodiment, process 500 may be performed as part of an anti-entropy correction routine described in connection with data plane 202 of FIG. 2.

In an exemplary embodiment, a system performing process 500 processes each of a collection of storage devices in turn and makes inaccessible a least a portion of data stored therein according to a device-specific deletion indication associated with the portion of storage device that the data is stored in. In some embodiments, a system performing process 500 processes each of the collection of storage devices in sequentially or in parallel. In some embodiments, multiple instances of process 500, each instance processing a different collection of storage devices, may be configured to run sequentially or in parallel. In some embodiments, a system performs process 500 on a periodic basis (e.g., daily, weekly, etc.), for example, as a background process. In some other embodiments, a system performs process 500 upon the occurrence of certain events (e.g., the triggering of a tinier).

Beginning in block 502, a system performing process 500 accesses the next available storage device. In decision block 504, a system performing process 500 determines whether a device-specific deletion indication associated with the current storage device has been reached. In some embodiments, if a device-specific deletion indication does not exist for the current storage device, a system performing process 500 dynamically determines whether at least a portion of the current storage device should be deleted based, for example, on data deletion indications associated with data objects stored in the storage device. In some other embodiments, a system performing process 500 uses traditional garbage collection techniques, such as mark-and-sweep, to remove data objects that are no longer in use. In yet other embodiments, a system performing process 500 skips processing the current storage device if a device-specific deletion indication does not exist.

In some embodiments, a device-specific deletion indication is reached if the current time is the same as or within a short period of time after the time indicated by the device-specific deletion indication. For example, if the device-specific deletion time is "Jun. 1, 2012" and the current date is either Jun. 1, 2012 or shortly thereafter, device-specific deletion indication may be considered to have been reached.

Still referring to FIG. 5, if a device-specific deletion indication associated with the current storage device is determined to have been reached, then in block 506, a system performing process 500 deletes data stored in at least the portion of the storage device that is associated with the device-specific deletion indication. As discussed above, in various embodiments, deleting a storage device portion includes overwriting the storage device portion with useless data, encrypting data stored in the storage device portion and rendering inaccessible the cryptographic key used to decrypt the data, formatting, degaussing, and/or physical destructing at least the storage device portion, and the like. Some of these embodiments, such as physical destruction of the storage device, may render data stored on the storage device permanently inaccessible. As discussed above, the particular deletion method used to delete at least the storage device portion may be specified by the device-specific deletion indication, and/or may depend on regulatory requirement governing data stored therein, inherent characteristics of the storage device, storage policies, service agreements, and the like.

In some embodiments, where the to-be-deleted storage device portion includes a data object with a data deletion time earlier than the device-specific deletion time, that data object may be rendered temporarily inaccessible (for example, by removing references to the data object) prior to the device-specific deletion time. In some embodiments, where the storage device portion to be deleted includes a data object with a data deletion time later than the device-specific deletion time, that data object may be copied to another location prior to the deletion of the storage device portion. Such may be the case when, for example, the data deletion time associated with a data object is changed to a later time after the data object is stored. In some embodiments, a system performing process 500 returns an error message or waits for a period of time when it is infeasible to render a storage device portion inaccessible, for example, because the storage device portion is being accessed for read and/or write.

In block 508, a system performing process 500 checks whether there are more storage device(s) to process. If so, a system performing process 500 loops back to block 502 to access the next storage device to process. Once all storage devices have been processed, a system performing process 500 ends in block 510.

In some embodiments where data shards of a data object are stored according to process 400 illustrated in FIG. 4, process 500 may be performed for storage devices containing some of the data shards of a data object to render the data object inaccessible. For example, as discussed above, if a data object is erasure-encoded into N data shards and X shards are necessary to reconstruct the data object, then process 500 may be performed on storage devices that collectively contain at least N−X+1 of the data shards to render the data object inaccessible. In other embodiments, process 500 may be performed for storage devices containing all data shards of a data object to render the data object inaccessible.

Figure 6:
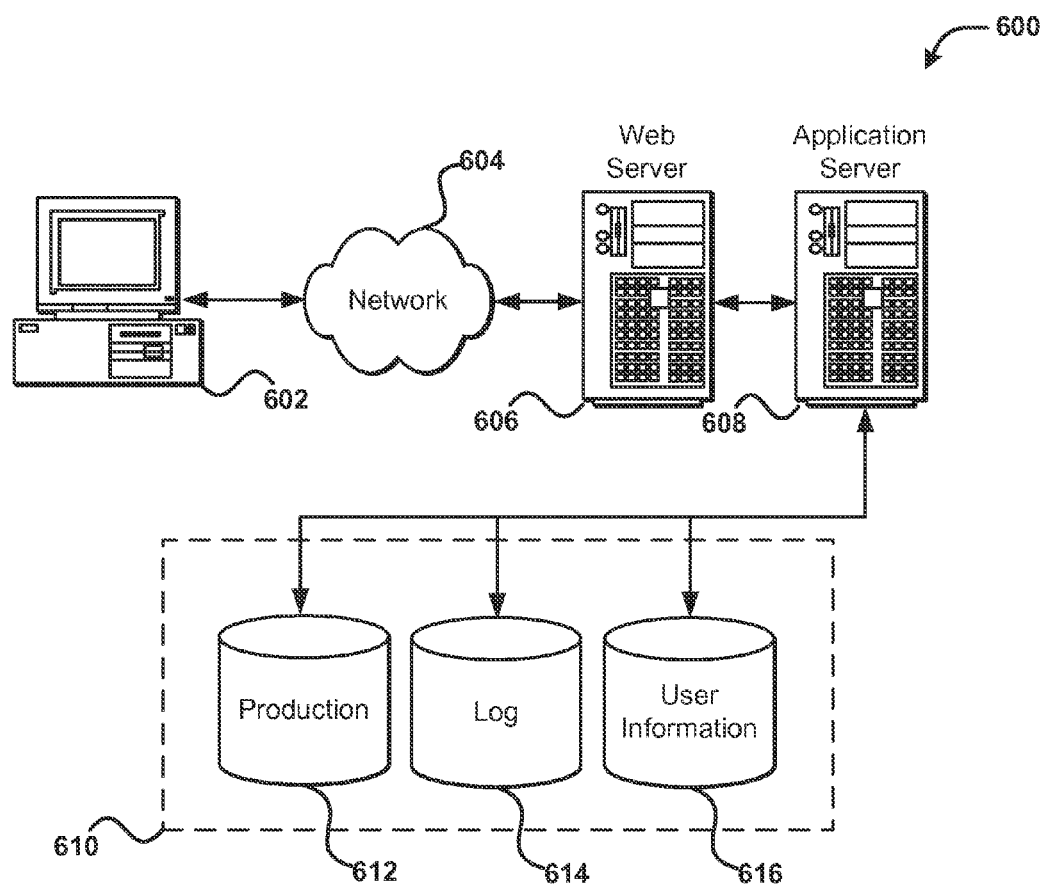
FIG. 6 illustrates an environment in which various embodiments can be implemented.

FIG. 6 illustrates aspects of an example environment 600 for implementing aspects in accordance with various embodiments. As will be appreciated, although Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases, or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, NFS, GIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for storing data, comprising:
   under the control of one or more computer systems configured with executable instructions,
   receiving a request, from a customer entity connected to a storage system, to store a data object, the request including a data deletion indication, specified by the customer entity when the request is made to store the data object, that indicates when to make the data object inaccessible and a particular deletion method specified by the customer entity when the request is made to store the data object that indicates how to delete the data object;
   in response to the request,
   obtaining, based at least in part on an encoding algorithm and the data object, a plurality of encoded data shards; and
   for each encoded data shard of at least some of the plurality of encoded data shards,
   selecting, from a plurality of storage devices in the storage system, a storage device based at least in part on a device-specific deletion indication associated with the storage device and on the data deletion indication, the device-specific deletion indication that indicates when to make inaccessible at least a portion of data stored in the storage device;
   updating the device-specific deletion indication associated with the storage device based at least in part on the data deletion indication of the request;
   storing the encoded data shard in the selected storage device as part of the portion of data stored in the storage device; and
   at a time corresponding to the device-specific deletion indication of the selected storage device, making inaccessible the portion of data stored in the selected storage device based at least in part on the data deletion indication.

2. The computer-implemented method of claim 1, wherein the device-specific deletion indication associated is based at least in part on one or more data deletion indications associated with one or more data objects stored in the storage device.

3. The computer-implemented method of claim 1, wherein selecting the storage device is based at least in part on an estimated life expectancy of the storage device.

4. The computer-implemented method of claim 1, wherein making inaccessible the portion of data includes rendering the portion of data irrecoverably inaccessible.

5. The computer-implemented method of claim 1, wherein making inaccessible the portion of data includes physically destroying the selected storage device.

6. The computer-implemented method of claim 1, wherein the data deletion indication is based at least in part on a regulatory compliance requirement.

7. The computer-implemented method of claim 1, wherein the particular deletion method includes at least one of: overwriting the data object with other data, encrypting the data object and rendering a cryptographic key for the encrypted data inaccessible, degaussing the storage device storing the data object, or shredding the storage device storing the data object.

8. A computer-implemented method for storing information, comprising:
   under the control of one or more computer systems configured with executable instructions,
   receiving a request, from a customer entity connected to a storage system, to store information, the request including an information deletion indication, specified by the customer entity when the request is made to store the information, that indicates when to make a portion of the information inaccessible and a particular deletion method specified by the customer entity when the request is made to store the information that specifies how to delete the portion of the information;
   selecting, from a plurality of storage devices in the storage system, a storage device based at least in part on the information deletion indication and a device-specific deletion indication associated with the storage device, the device-specific deletion indication indicating when to make inaccessible the information stored on the storage device;

updating the device-specific deletion indication associated with the storage device based at least in part on the information deletion indication of the request; and causing storage of at least the portion of the information in the selected storage device.

9. The computer-implemented method of claim 8, wherein receiving the request comprises determining the information deletion indication based at least in part on a customer entity specified regulatory compliance requirement.

10. The computer-implemented method of claim 8, wherein selecting the storage device comprises:

determining a plurality of device-specific deletion indications associated with the plurality of storage devices, each of the plurality of device-specific deletion indications indicating when to make inaccessible at least the portion of information stored in the corresponding storage device; and wherein causing storage of the information includes causing the information to be stored as part of the portion of information stored in the storage device.

11. The computer-implemented method of claim 10, wherein determining the device-specific deletion indications is based at least in part on one or more criteria unrelated to the information deletion indication.

12. The computer-implemented method of claim 10, further comprising:

making inaccessible at least the portion of information stored in the storage device according to the device-specific deletion indication.

13. The computer-implemented method of claim 8, further comprising:

receiving a second request to store second information, the second information being associated with a second information deletion indication that indicates when to make the second information inaccessible; and storing the second information in the selected storage device, based at least in part on the proximity of the information deletion indication and the second information deletion indication.

14. A non-transitory computer-readable storage medium having stored thereon instructions for causing at least one computer system to store data, the instructions comprising:

instructions that cause said at least one computer system to, as a result of a received request, from a customer entity connected to a storage system, to store a data object, the received request including a data deletion indication, specified by the customer entity when the request is made to store the data object, indicating when to make the data object inaccessible and a particular deletion method specified by the customer entity when the request is made to store the data object that specifies how to delete the data object, the data object stored by at least:

cause said at least one computer system to select, from a plurality of storage devices of the storage system, a storage device based at least in part on the data deletion indication and a device-specific deletion indication associated with the storage device, the device-specific deletion indication indicating when to make inaccessible the information stored on the storage device;

update the device-specific deletion indication associated with the storage device based at least in part on the data deletion indication of the received request; and cause said at least one computer system to cause storage of the data object in the selected storage device.

15. The non-transitory computer-readable storage medium of claim 14, wherein the instructions that cause said at least one computer system to select the storage device are based at least in part on one or more criteria other than the data deletion indication.

16. The non-transitory computer-readable storage medium of claim 14, wherein the instructions that cause said at least one computer system to select the storage device comprises instructions that cause the at least one computer system to determine the device-specific deletion indication that indicates when to make inaccessible at least a portion of data stored in the selected storage device.

17. The non-transitory computer-readable storage medium of claim 16, instructions that cause said at least one computer system to cause storage of the data object comprises instructions that cause the at least one computer system to cause the data object to be stored as part of the portion of data stored in the selected storage device.

18. The non-transitory computer-readable storage medium of claim 17, further comprising instructions that cause the at least one computer system to make inaccessible the portion of data stored in the selected storage device according to the device-specific deletion indication.

19. The non-transitory computer-readable storage medium of claim 18, wherein the instructions that cause the at least one computer system to make inaccessible the portion of data includes instructions that cause the at least one computer system to make the portion of data permanently inaccessible.

20. The non-transitory computer-readable storage medium of claim 14, wherein the data deletion indication is based at least in part on a regulatory compliance requirement.

21. A system for storing data, comprising:

a communication device operable to receive requests, from a customer entity connected to a storage system, to store data objects, the received requests including data deletion indications, specified by the customer entity when the requests are made to store data objects, indicating when to make the data objects inaccessible and particular deletion methods specified by the customer entity when the requests are made to store the data objects that specify how to delete the data objects;

a plurality of storage devices in the storage system; and at least one processor operable to, in response to a received request to store a data object that is associated with a corresponding data deletion indication:

select a storage device from the plurality of storage devices based at least in part on the data deletion indication and a device-specific deletion indication associated with the storage device, the device-specific deletion indication indicating when to make inaccessible the data objects on the storage device;

update the device-specific deletion indication associated with the storage device based at least in part on the data deletion indication; and store the data object in the selected storage device.

22. The system of claim 21, wherein said at least one processor is further operable to determine the device-specific deletion indication that indicates when to make inaccessible at least a portion of data stored in the selected storage device.

23. The system of claim 22, further comprising at least one processor operable to make inaccessible at least the portion of data stored in the selected storage device according to the device-specific deletion indication.

24. The system of claim 23, wherein the data deletion indication is based at least in part on at least in part on a user-specified regulatory compliance requirement.

25. The system of claim 21, wherein:
the communication device is operable to receive and process requests to store data objects from devices of multiple tenants;
the system stores data for a plurality of the multiple tenants on the same storage device of the plurality of storage devices.

* * * * *